(12) United States Patent
Schulze et al.

(10) Patent No.: US 12,296,761 B2
(45) Date of Patent: May 13, 2025

(54) MOTOR VEHICLE FLOOR COVERING

(71) Applicant: Adler Pelzer Holding GMBH, Hagen (DE)

(72) Inventors: Volkmar Schulze, Schierling (DE); Helmut Becker, Bochum (DE); Volker Kursch, Essen (DE)

(73) Assignee: Adler Pelzer Holding GMBH (DE)

( * ) Notice: Subject to any disclaimer, the term of this patent is extended or adjusted under 35 U.S.C. 154(b) by 1291 days.

(21) Appl. No.: 16/969,747

(22) PCT Filed: Feb. 5, 2019

(86) PCT No.: PCT/EP2019/052702
§ 371 (c)(1),
(2) Date: Aug. 13, 2020

(87) PCT Pub. No.: WO2019/158389
PCT Pub. Date: Aug. 22, 2019

(65) Prior Publication Data
US 2021/0001787 A1   Jan. 7, 2021

(30) Foreign Application Priority Data
Feb. 15, 2018  (DE) .................. 102018103462.8

(51) Int. Cl.
*B60R 13/00*   (2006.01)
*B29C 44/14*   (2006.01)
(Continued)

(52) U.S. Cl.
CPC .......... *B60R 13/0815* (2013.01); *B29C 44/14* (2013.01); *B60N 3/048* (2013.01);
(Continued)

(58) Field of Classification Search
CPC ..... B60R 13/0815; B29C 44/14; B60N 3/048; B29K 2075/00; B29K 2995/0063; B29K 2995/0082; B29L 2031/3017
See application file for complete search history.

(56) References Cited

U.S. PATENT DOCUMENTS 4,579,764 A   4/1986  Peoples, Jr. et al.
9,321,412 B2  4/2016  Ikeji et al.
(Continued)

FOREIGN PATENT DOCUMENTS

DE   3623789 A       1/1988
DE   3904812 A1  *   8/1990
(Continued)

OTHER PUBLICATIONS

DE-3904812-A1 Computer translation (Year: 1990).*
(Continued)

*Primary Examiner* — Steven O Douglas
(74) *Attorney, Agent, or Firm* — Seth L. Hudson; Maynard Nexsen PC

(57) ABSTRACT

The invention relates to an underbody panel insulation for a motor vehicle made of one or more foamed viscoelastic polyurethane foam materials which can differ in zones (partially) over the surface and thickness of the insulation in its formulation and the physical and mechanical properties, and to a method for the production thereof.

10 Claims, 3 Drawing Sheets

(51) Int. Cl.
  *B60N 3/04* (2006.01)
  *B60R 13/08* (2006.01)
  *B29K 75/00* (2006.01)
  *B29L 31/30* (2006.01)

(52) U.S. Cl.
  CPC .. *B29K 2075/00* (2013.01); *B29K 2995/0063* (2013.01); *B29K 2995/0082* (2013.01); *B29L 2031/3017* (2013.01)

(56) References Cited

U.S. PATENT DOCUMENTS

| | | |
|---|---|---|
| 2005/0150720 A1 | 7/2005 | Tudor et al. |
| 2017/0008462 A1 | 1/2017 | Taniguchi et al. |
| 2017/0240123 A1 | 8/2017 | Kossanyi |
| 2017/0369005 A1* | 12/2017 | Iwata .................... B29C 43/203 |

FOREIGN PATENT DOCUMENTS

| | | |
|---|---|---|
| DE | 3905607 A1 | 8/1990 |
| DE | 19958663 A1 | 6/2001 |
| DE | 10324735 B3 | 11/2004 |
| DE | 202008004918 U1 | 7/2008 |
| DE | 102008013808 A1 | 9/2009 |
| DE | 102008017893 A1 | 10/2009 |
| DE | 102009058819 A1 | 8/2010 |
| DE | 102010034159 A1 | 2/2012 |
| DE | 102011085190 A1 | 2/2013 |
| DE | 102012003093 A1 | 8/2013 |
| EP | 0169627 A2 | 1/1986 |
| EP | 0210102 B1 | 5/1990 |
| EP | 0733004 B1 | 9/1996 |
| EP | 3012155 A1 | 4/2016 |
| GB | 2138012 A * | 10/1984 ............. C08G 18/40 |
| JP | S6220746 A | 1/1987 |
| JP | 2020-543181 | 5/2023 |
| RU | 2003 134 009 A | 2/2005 |
| RU | 2 625 359 C2 | 7/2017 |
| WO | 2001042053 A1 | 6/2001 |
| WO | 2006/018190 A1 | 2/2006 |
| WO | 2006/032433 A1 | 3/2006 |

OTHER PUBLICATIONS

International Search Report for International Application No. PCT/EP2019/052702 mailed on Apr. 29, 2019.

Polyurethanes: Almost infinite variety; URL: "https://www.fsk-vsv.de/wp-content/uploads/2016/ 10/Polyurethane-F ast-unendliche-Vielfalt-. pdf". Jul. 10, 2016. Specialist Association for Foamed Plastics and Polyurethanes eV, Stuttgart, 2016.

A. Acker et al.: Adhesive. in: Dictionary of Chemistry. Pages 1 to 8. Spectrum Academic Verlag, Heidelberg. 1998.

The old secret of gluing. In: Schreiner Zeitung 38/2015. Sep. 17, 2015.

German Office Action Date Oct. 30, 2024.

* cited by examiner

MOTOR VEHICLE FLOOR COVERING

CROSS-REFERENCE TO RELATED APPLICATION(S)

The present patent/application is a National Stage Application of PCT/EP2019/052702, filed Feb. 5, 2019, and entitled "MOTOR VEHICLE FLOOR COVERING," which claims priority to German Patent Application 10 2018 103 462.8 filed Feb. 15, 2018, and entitled "MOTOR VEHICLE FLOOR COVERING."

FIELD OF THE INVENTION

The invention relates to a floor covering insulation for a motor vehicle consisting of one or more foamed visco-elastic polyurethane foams, which may differ in formulation and physical and mechanical properties from zone to zone (partially) over the surface and thickness of the insulation, and to a process for the preparation thereof.

The object is to improve the acoustic effectiveness of floor covering systems in motor vehicles because of the increase of the insulation properties caused by the foam insulation.

BACKGROUND OF THE INVENTION

In the prior art, the following floor covering insulations are known:
a.) Visco-elastic foam, DE 39 05 607 A1, WO 2006/032433 A1
b.) Lightweight foam (cut foam), DE 10 2008 017 893 A1 (partially)
c.) Foam with partially differing density. EP 0 210 102 B1, EP 0 169 627 A2
d.) Non-woven (adhesive-bonded/laminated non-woven stamped parts)
e.) Preformed (adhesive-bonded) non-wovens
f.) Fiber flock insulation (HMP), DE 10 2008 013 808 A1. DE 103 24 735 B3
g.) Non-wovens with standing/vertical fiber orientation, US 2017/0008462 A1, U.S. Pat. No. 9,321,412 B2
h.) Fiber flock insulation (HMP) with standing/vertical fiber orientation. DE 10 2012 003 093 A1, DE 10 2010 034 159 A1

Also, heavy layers are employed for insulation on the full area or partially as an intermediate layer in the material structure of floor coverings; further, PE/PA/PE and PE/PA sheets with a higher PA weight per surface area and so-called PE/PA/PE+PET sheet non-wovens are employed as contact non-wovens to the foam.

It is further known that so-called crash elements, floor mat fastening elements and footrest elements are included in the foaming or foam-embedding.

Also, it is predominantly EPS, EPP and PEPP inlays that are embedded in the foam insulation, in order to increase the footstep resistance, among other things. A structure with spacers for this is described in DE 10 2009 058 819 A1.

Further, it is known to foam-embed composite foam pieces (DE 36 23 789 A1).

In DE 20 2008 004 918 U1, it is stated that antinoise films are (partially) applied in several places to the carpet composite in a force-locking or material-locking manner.

For example, DE 10 2011 085 190 A1 describes antinoise coatings, which are classically applied to the underbody.

Antinoise coatings are heavy sheets that are partially attached to the underbody as separate components according to need. This means additional working steps during the mounting, and an increase in weight in the vehicle itself.

The solution as set forth in DE 20 2008 004 918 U1, which is to partially integrate heavy/antinoise sheets in the floor covering, requires a complicated production method. Further, separate components/sheets must be prepared (individually), which must then be placed in the mold by additional working steps.

DE 199 58 663 A1 describes a lightweight sound insulation with partial footstep resistance. It is stated that at least one locally limited region has a differing mixing ratio of polyol to isocyanate as compared to adjacent regions, the density is smaller than 70 g/l, the adjacent regions have about a uniform density, and the percent area of the at least one locally limited region does not exceed about 20% of the total area. A sound-insulating effect of the foam system is not reported; to the contrary, it is described that a non-woven layer is further provided between the insulating layer and the foam system.

The other floor covering insulations mentioned in the prior art do not have any specific insulation properties within the meaning of the present invention.

DE 20 2015 004 233 U1 describes a seat in which two foams having different densities are laid on top of one another. The lower foam layer is visco-elastic in nature. A multizone design of the PU foam insulation according to need (corresponding to an internal combustion engine variant and an electric drive variant), namely different PU foam properties over the surface and thickness of the insulation, is not provided.

BRIEF SUMMARY OF THE INVENTION

It is the object of the invention to modify a per se known polyurethane (PU) foam formulation for a floor covering so as to provide it with a high extent of sound-insulating properties, wherein the foam system has properties that vary according to need over the surface of the floor covering insulation, and thus the weight per surface area of antinoise coatings can be reduced, or they may be omitted as an additional component.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In a first embodiment, the above object is achieved by a motor vehicle floor covering 1 having a floor covering insulation 2 consisting of a foamed polyurethane foam with visco-elastic properties, which is characterized in that said floor covering insulation 2 covers the lower side of the floor covering according to need with respectively the same or different foam compositions in one or more independent or contiguous locally limited regions. The foaming tools are divided into individual zones/nests in accordance with said according-to-need requirements. The zone/nest separating lands seal in a force-locking manner on the lower side of the carpet/upper material. The foamed polyurethane foam is composed of one or more polyurethane component mixtures.

In another embodiment of the present invention, the above object is achieved by a process for preparing a motor vehicle floor covering 1, characterized in that (a) in an open mold in which a contoured floor covering is placed onto the upper mold, one or more polyurethane component mixtures for preparing a foam having viscoelastic properties are introduced into the lower mold in a locally limited way according to need, and (b) the mold is closed, optionally with heating, and (c) the component mixture or mixtures are foamed and reacted to completion.

In principle, the PU foam formulations are cast into the open mold while being foamed:

The foaming mold is opened; the floor covering/the upper material is provided in the upper mold; the foam systems are cast or foamed into the corresponding mold nests through one or more mixing heads, which are provided on a robot arm. Preferably, so-called duplex mixing heads are employed, in which two foam systems, or one or more foamed polyurethane foam components mixture, can be introduced through one mixing head simultaneously or at different times.

The lower mold may contain one or more mold nests and one or more polyurethane component mixtures are introduced into the one or more mold nests. The one or more polyurethane component mixtures are cast into the lower mold using one or more mixing heads. The compositions of the one or more polyurethane component mixtures may van while introduced into the lower mold.

Further, the density of the individual foam systems can be varied through the shot weight. The density of the foamed polyurethane foam composition of the floor covering insulation may be adjusted by varying the shot weight.

Figure 1:
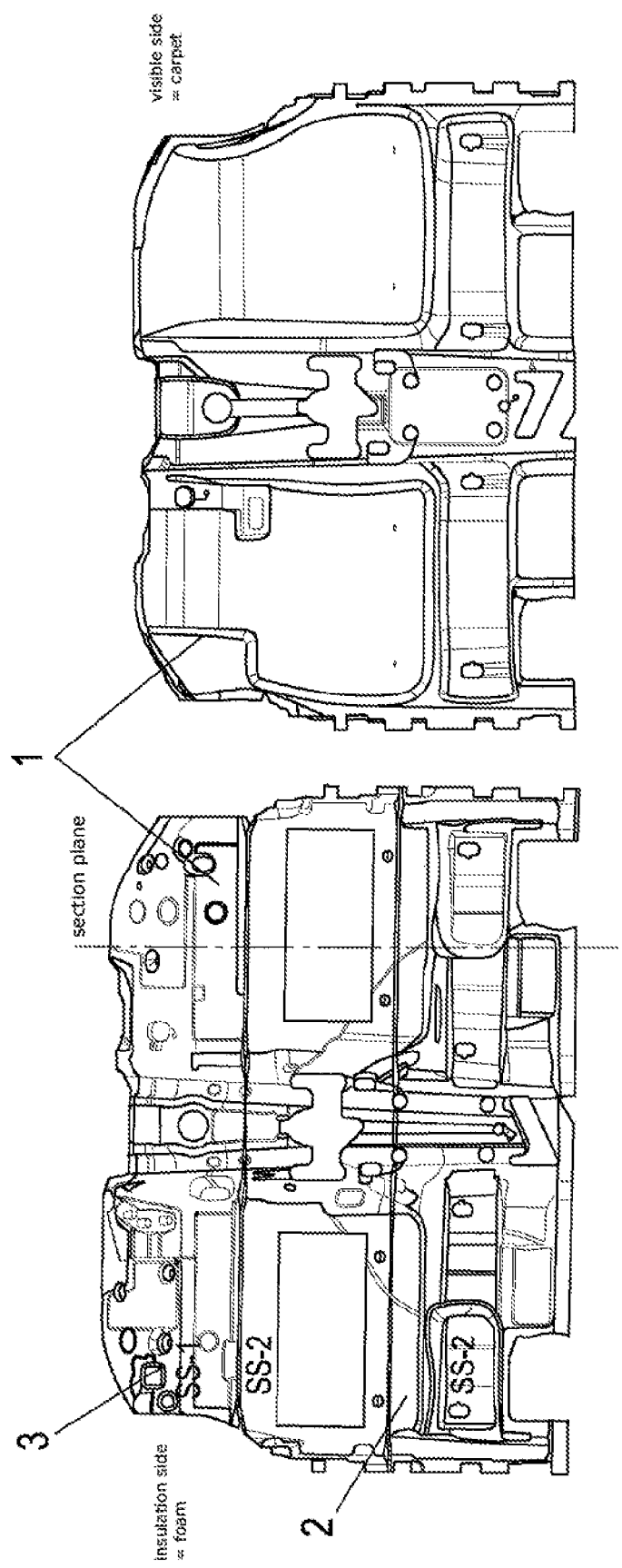
FIG. 1 is one embodiment of the foam system of the present invention.
Figure 2:
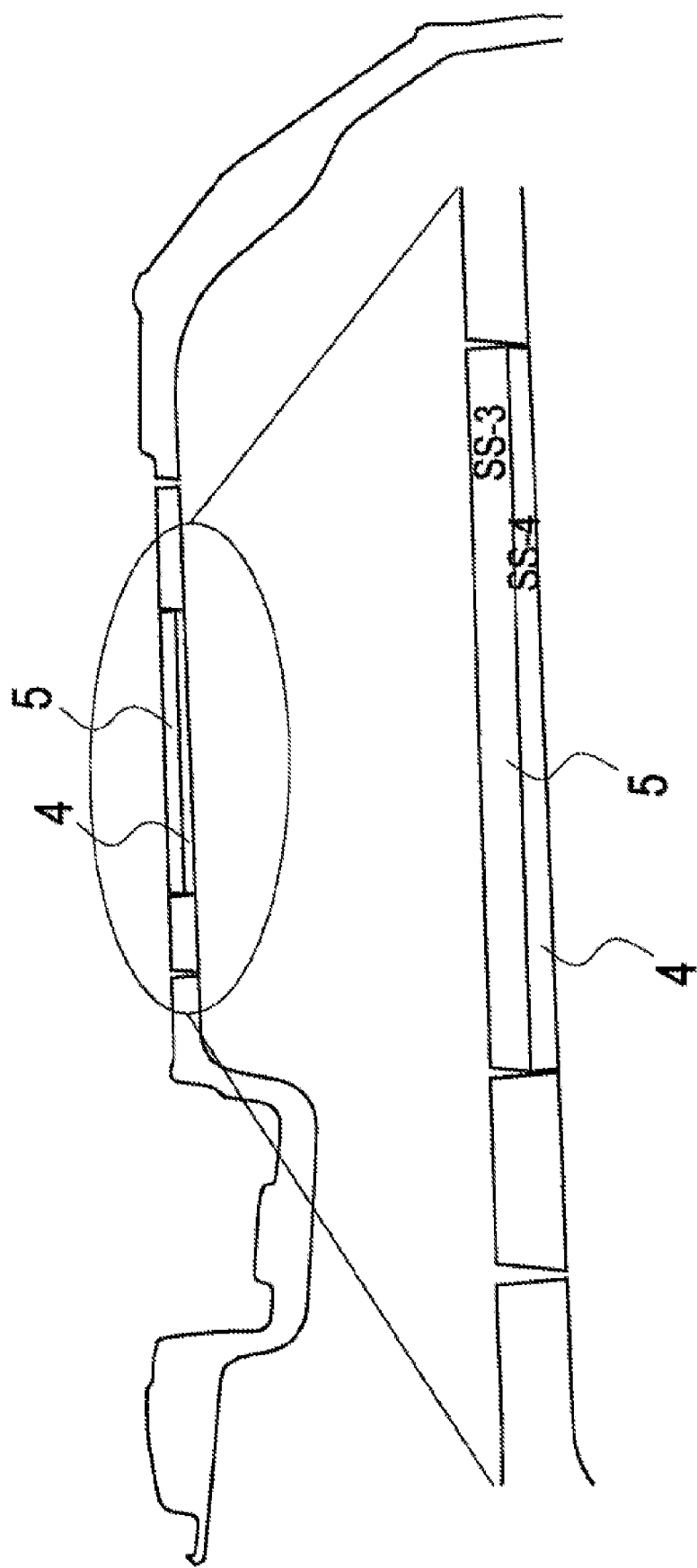
FIG. 2 is another embodiment of the foam system of the present invention.

FIGS. 1 and 2 show an embodiment of the present invention:

The Figures represent 4 possible foam systems; wherein the foam system SS-4 (4) is adhesive-bonded to the lower side of the floor covering/upper material prior to foaming in the practical implementation; and then the foam systems SS-1 (3) to SS-3 (5) are cast/foamed in by means of mixing heads attached to robot arms.

Represented herein in FIG. 2 are [SS-3 (5)/SS-4 (4)], which are arranged over the thickness; two different foam systems and thus different foam properties.

The following Table 1 represents the physical foam properties of the different regions according to FIG. 1 in an exemplary manner:

TABLE 1

|  | SS-1 | SS-2 | SS-3 | SS-4 |
|---|---|---|---|---|
| Density [kg/m$^3$] | 45-75 | 60-90 | 65-90 | 75-105 |
| Modulus of elasticity [kN/m$^2$] | 20-60 | 80-120 | 50-120 | 100-250 |
| Loss factor | 0.10-0.30 | 0.25-0.45 | 0.33-0.60 | 0.10-0.35 |

Figure 3:
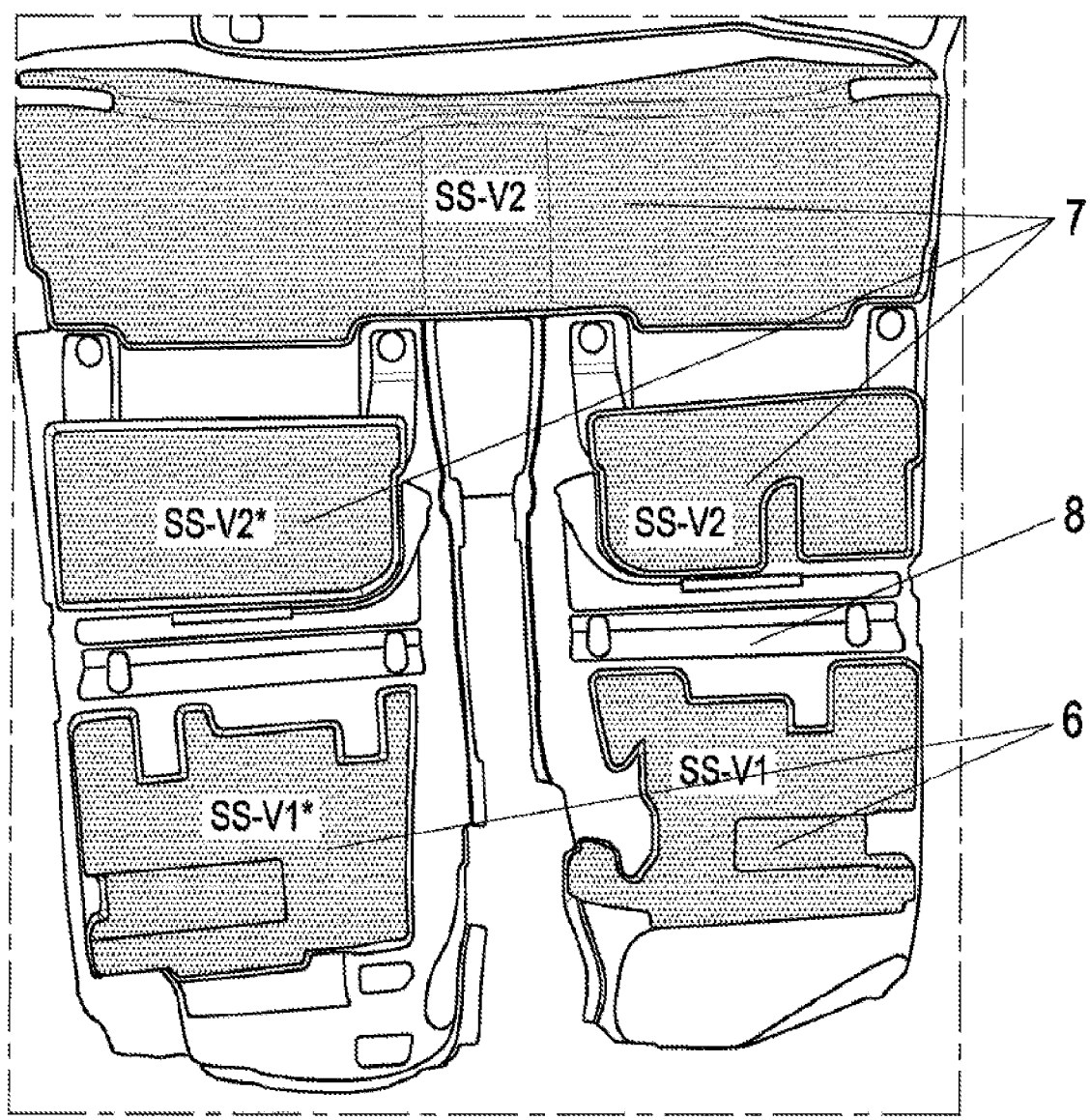
FIG. 3 is another embodiment of the foam system of the present invention.

The following Table 2 represents the physical foam properties of the different regions according to FIG. 3 in an exemplary manner:

TABLE 2

|  | SS-V1 | SS-V1* | SS-V2 | SS-V2* |
|---|---|---|---|---|
| Density [kg/m$^3$] | 50-75 | 65-90 | 65-90 | 75-105 |
| Modulus of elasticity [kN/m$^2$] | 50-120 | 50-120 | 100-250 | 100-250 |
| Loss factor | 0.10-0.30 | 0.10-0.30 | 0.33-0.60 | 0.33-0.60 |

The foamed polyurethane foam of the floor covering insulation may have a modulus of elasticity within a range of from 20 to 250 kN/m$^2$, a loss factor within a range of from 0.1 to 0.8, and a density within a range of from 35 to 120 g/l. Alternatively, the foamed polyurethane foam of the floor covering may have a loss factor within a range of from 0.2 to 0.6, and a density within a range of from 45 to 80 g/l. The foam surface on the body side, which may be the side of the floor covering insulation that contacts the motor vehicle when mounted or the body of the motor vehicle, may be ribbed or contoured. This feature is employed if the focus is on insulation, but not if the focus is on the reduction of the metal sheet vibrations. A lower surface of the floor covering insulation may be in contact with the motor vehicle or the body of the motor vehicle and this lower surface may have adhesive properties for engaging the floor covering insulation to the motor vehicle or the body of the motor vehicle.

Of course, the design of the foam upper side/surface on the side of the metal sheet/body is also defined by the contour of the underfloor and the cables and air ducts that are present there. On this and on the mounting conditions of the floor covering, the setting of the adhesion of the foam surface depends.

Thus, the core of the present invention is the integration of the insulating properties into the foam insulation, i.e. into the PU foam formulation itself without additional preparation processes or working steps.

Further, in the multizone design of the PU foam insulation according to need (corresponding to an internal combustion engine variant and an electric drive variant), different PU foam properties can be set over the surface and thickness of the insulation.

The advantage is the omission of a component, or the reduction of the weight per surface area, namely of the antinoise coating or coatings. Further, the advantage of the inventive solution resides in the cost: increased sound insulation in the floor covering insulation integrated in the PU foam itself, and omission of an additional preparation step.

The foam insulation may also include EPS, EPP and PEPP inlays that are embedded in the foam insulation in order to increase the footstep resistance, among other things. The foam insulation may also include a structure with spacers, such as spacer knitwear.

EXAMPLE

According to the invention, a floor covering/motor vehicle carpet 1 with increased insulation properties of the foam insulation 2 has been prepared (see FIG. 3).

The upper material was a commercially available dilour carpet (600 g/m$^2$ PET fiber, black, with 100 g/m$^2$ latex binder and 100 g/m$^2$ PE coating), laminated with 1000 g/m$^2$ heavy layer and a PE/PA sheet, 100 µm.

The forming of the upper material was effected in a standard thermoforming plant (delivery table/laminating in the contact heating field/forming). This formed upper material was foam-backed in the process "foaming into the open mold" with 2 foam systems (SS-V1 6 and SS-V2 7); the densities of the 2 foam systems were varied through the shot weight (*). A commercially available duplex mixing head as the mixing head.

The foam surface of the foams SS-V2 7 and SS-V2* 7 was set to be adhesive. Also, the foam-free areas 8 between the independent, locally limited regions of the lower side of the floor covering with respectively different foam compositions can be clearly seen here according to Table 2.

The invention claimed is:

1. A motor vehicle floor covering with a floor covering insulation, comprising a foamed polyurethane foam with visco-elastic properties, wherein the floor covering insulation covers a lower side of the motor vehicle floor covering with the same or different foam compositions in one or more independent or contiguous locally limited regions,
    wherein the foamed polyurethane foam of the floor covering insulation has
        a modulus of elasticity within a range of from 20 to 250 $kN/m^2$,
        a loss factor within a range of from 0.1 to 0.8, and
        a density within a range of from 35 to 120 g/l,
    wherein the regions of the floor covering insulation have different foamed polyurethane foam compositions with a different compression hardness, and
    wherein the foamed polyurethane foam includes EPS, EPP and/or PEPP inlays, wherein a lower surface of the floor covering insulation has adhesive properties and contacts a body when mounted into the motor vehicle.

2. The motor vehicle floor covering according to claim 1, wherein the foamed polyurethane foam of the floor covering insulation has a loss factor within a range of from 0.2 to 0.6, and a density within a range of from 45 to 80 g/l.

3. The motor vehicle floor covering according to claim 1, wherein the thickness of the floor covering insulation is adapted according to need in a locally limited manner on the body side.

4. The motor vehicle floor covering according to claim 1, wherein the foamed polyurethane foam contains a surface on a body side of the motor vehicle that is contoured.

5. The motor vehicle floor covering according to claim 1, wherein the foamed polyurethane foam includes spacer knitwear.

6. A process for preparing a motor vehicle floor covering with a floor covering insulation; comprising:
    (a) providing a mold and a contoured floor covering;
    (b) placing onto an upper mold of the mold the contoured floor covering;
    (c) introducing one or more polyurethane component mixtures for preparing a foam having viscoelastic properties into a lower mold of the mold, wherein the compositions of the one or more polyurethane component mixtures are varied while introduced into the lower mold;
    (d) closing the mold;
    (e) heating the mold; and
    (f) foaming the one or more polyurethane component mixtures forming a foamed polyurethane foam composition.

7. The process according to claim 6, wherein the lower mold contains one or more mold nests and the one or more polyurethane component mixtures are introduced into the one or more mold nests of the lower mold.

8. The process according to claim 6, wherein the one or more polyurethane component mixtures are cast into the lower mold using one or more mixing heads.

9. The process according to claim 6, wherein the density of the foamed polyurethane foam composition of the floor covering insulation is adjusted by varying the shot weight.

10. The process according to claim 6, wherein the foamed polyurethane foam composition contains
    a modulus of elasticity within a range of from 20 to 250 $kN/m^2$,
    a loss factor within a range of from 0.1 to 0.8, and
    a density within a range of from 35 to 120 g/l.

* * * * *